United States Patent [19]

Sagisaka et al.

[11] 4,286,560

[45] Sep. 1, 1981

[54] METHOD AND APPARATUS FOR CONTROLLING AN IGNITION TIMING

[75] Inventors: Yasuo Sagisaka, Kariya; Toshio Kondo, Anjo; Akio Kobayashi, Kariya, all of Japan

[73] Assignee: Nippondenso Co., Ltd., Kariya, Japan

[21] Appl. No.: 134,335

[22] Filed: Mar. 26, 1980

[30] Foreign Application Priority Data

Mar. 28, 1979 [JP] Japan .................. 54-36470

[51] Int. Cl.$^3$ .................................................. F02P 5/04
[52] U.S. Cl. ................................. 123/417; 123/416
[58] Field of Search ......... 123/117 R, 117 D, 32 EB, 123/415, 416, 417, 480, 486, 489

[56] References Cited

U.S. PATENT DOCUMENTS

| | | | |
|---|---|---|---|
| 3,969,614 | 7/1976 | Moyer | 123/480 |
| 4,047,507 | 9/1977 | Noguchi | 123/32 EB |
| 4,130,095 | 3/1980 | Bowler | 123/489 |
| 4,131,097 | 12/1978 | Sawada | 123/117 D |
| 4,191,146 | 4/1980 | Taplin | 123/415 |
| 4,201,161 | 5/1980 | Sasayama | 123/416 |
| 4,236,214 | 11/1980 | Sasayama | 123/417 |

*Primary Examiner*—Ronald B. Cox
*Attorney, Agent, or Firm*—Cushman, Darby & Cushman

[57] ABSTRACT

An apparatus for controlling an ignition timing of an internal combustion engine for each ignition cycle. The apparatus fetches digital signals representing an intake pipe negative pressure and the number of revolutions of the internal combustion engine, and a digital signal representing a fuel injection time, and computes a basic timing of ignition spark by using the intake pipe negative pressure and the number of revolutions. When the intake pipe negative pressure and the number of revolutions, both being sensed currently, have ratios of changes falling within given values, compared with those sensed precedingly, correction values read out from a memory device on the basis of the intake pipe negative pressure and the number of revolutions are corrected so as to reduce the fuel injection time in accordance with the result of a comparison of the fuel injection time of the fuel injection currently performed with that of the fuel injection precedingly performed. An ignition timing is determined by correcting the basic ignition timing depending on the corrected correction value of the ignition timing. The corrected correction value is loaded into the memory device in place of the correction value before correction. When the intake pipe negative pressure and the number of revolutions, both being sensed currently, changes with ratio which falls out of fixed values, compared with those sensed precedingly, the basic ignition timing is corrected by the correction value of ignition timing read out on the basis of the intake pipe negative pressure and the number of revolutions, without correcting by the fuel injection time, thereby to determine an ignition timing. An ignition signal is applied to an internal combustion engine igniting device in accordance with the ignition timing determined.

9 Claims, 5 Drawing Figures

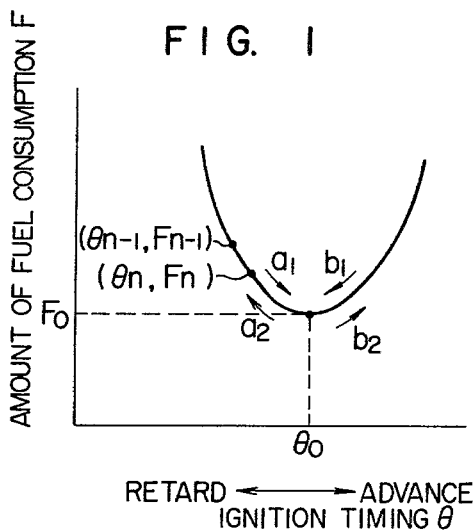
FIG. 1
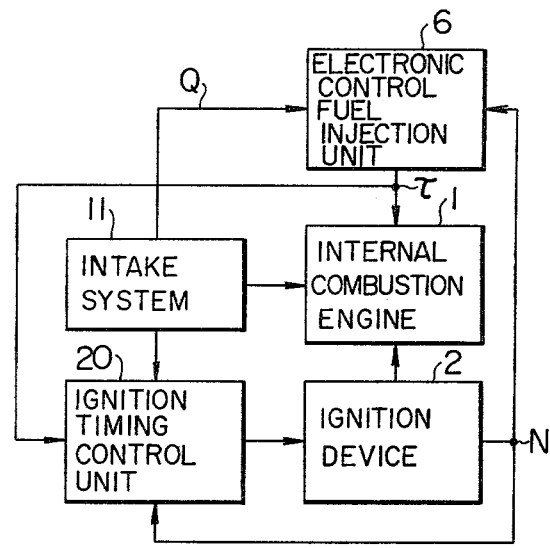
FIG. 2A
FIG. 2B
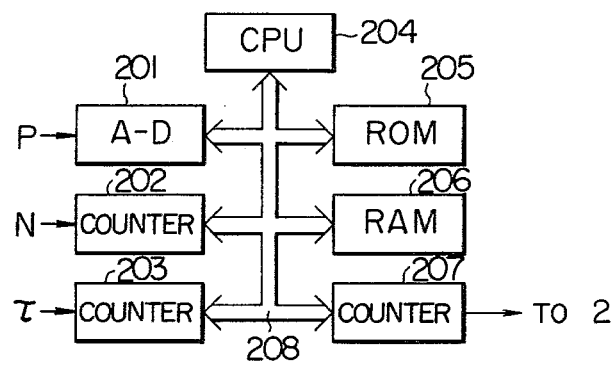
FIG. 4
| P\N | | | | | r-2 | r-1 | r | r+1 | r+2 | r+3 | | | |
|---|---|---|---|---|---|---|---|---|---|---|---|---|---|
| | | | | | | | | | | | | | |
| | | | | | | | | | | | | | |
| P-1 | | | | | $T_{P-1}^{r-2}$ | $T_{P-1}^{r-1}$ | $T_{P-1}^{r}$ | $T_{P-1}^{r+1}$ | $T_{P-1}^{r+2}$ | $T_{P-1}^{r+3}$ | | | |
| P | | | | | $T_{P}^{r-2}$ | $T_{P}^{r-1}$ | $T_{P}^{r}$ | $T_{P}^{r+1}$ | $T_{P}^{r+2}$ | $T_{P}^{r+3}$ | | | |
| P+1 | | | | | $T_{P+1}^{r-2}$ | $T_{P+1}^{r-1}$ | $T_{P+1}^{r}$ | $T_{P+1}^{r+1}$ | $T_{P+1}^{r+2}$ | $T_{P+1}^{r+3}$ | | | |
| | | | | | | | | | | | | | |
| | | | | | | | | | | | | | |
NEGATIVE PRESSURE
NUMBER OF REVOLUTIONS

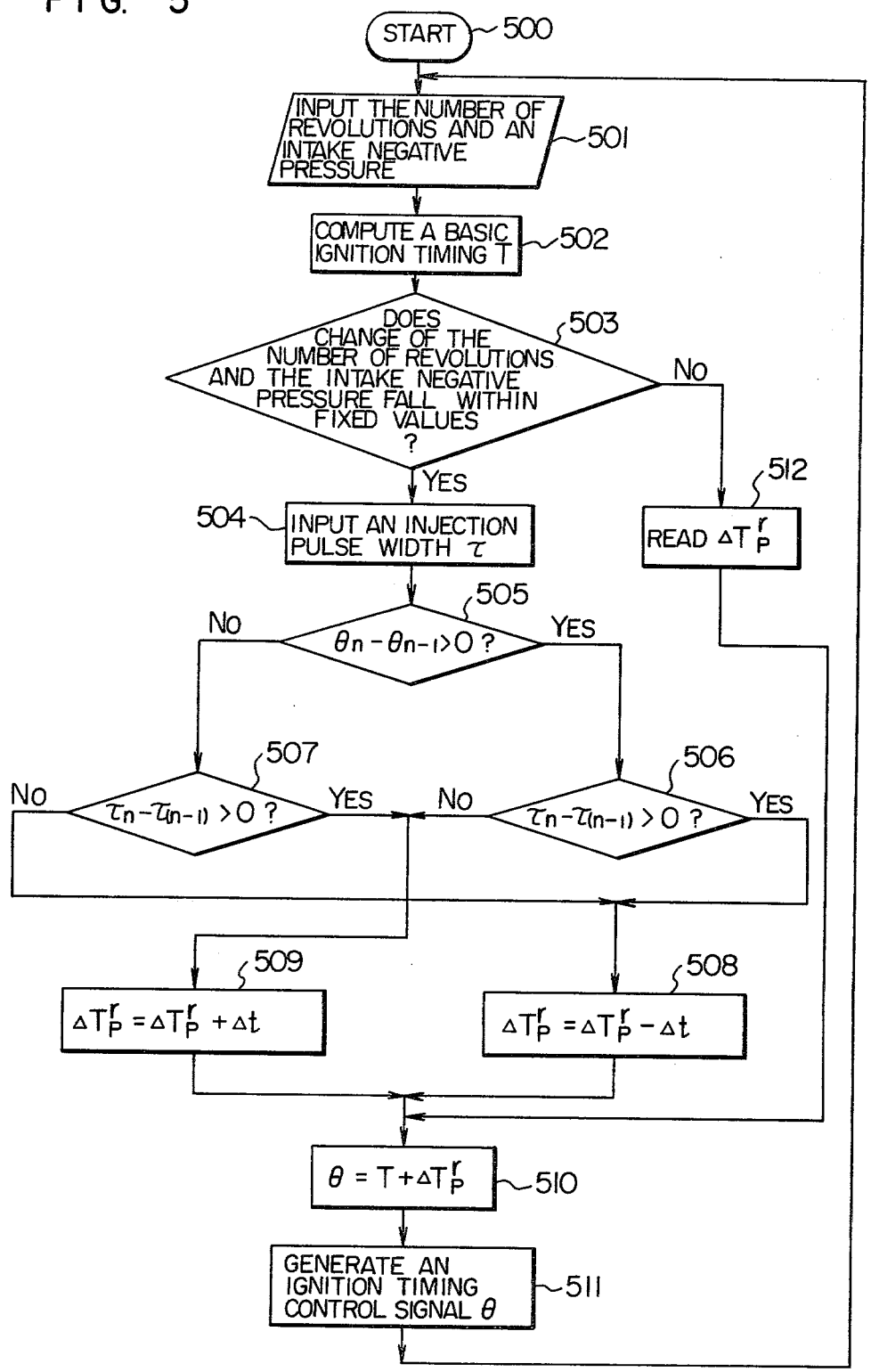

METHOD AND APPARATUS FOR CONTROLLING AN IGNITION TIMING

BACKGROUND OF THE INVENTION

The invention relates to a method and apparatus for feedback-controlling ignition timing so that the ratio of the amount of fuel consumption to output torque, i.e. a fuel efficiency, is maximized.

Conventionally, ignition timing in an internal combustion engine is controlled by using a centrifugal advance device to make the ignition timing advance with respect to the engine speed and a diaphragm advance device to make the ignition timing advance with respect to an intake air pipe negative pressure.

The fuel efficiency of an internal combustion engine depends largely on ignition timing. In conventional control systems, it is impossible to control the ignition timing accurately over the entire range of the engine operating conditions so as to maximize the fuel efficiency, and this makes the fuel efficiency poor.

SUMMARY OF THE INVENTION

An object of the present invention is to improve the fuel efficiency of an internal combustion engine by correcting ignition timing for each engine operating condition so that the fuel efficiency is maximized in accordance with the amount of fuel consumption measured and feeding back a correction value for the ignition timing control while at the same time storing the correction value, and controlling the ignition timing.

According to the present invention it is possible to correct automatically ignition timing errors is caused by variations of the cooling water temperature of the internal combustion engine, variations of the intake air temperature, variations of the amount of the exhaust gas recirculation, manufacturing variations of the internal combustion engines, and the like.

A feature of a method for controlling ignition timing of an internal combustion engine according to the invention resides in computing the amount of fuel consumption of an internal combustion engine, judging whether the amount of fuel consumption has increases or not from the currently computed amount of fuel consumption and an amount of fuel consumption computed at a previous time, computing an ignition timing correction value in accordance with at least one current engine operating condition so as to reduce the amount of fuel consumption, the computation of the correction amount depending on the result of the judgement, storing in a memory means the correction amount computed in accordance with the engine operating condition, and controlling the ignition timing on the basis of the correction value stored.

According to this invention it is possible to maximize the fuel efficiency of an engine, and correct ignition timing errors providing the maximum fuel efficiency due to dispersion of the engine automatically. The correction value is computed for each engine operating condition and stored, so that, even when the operating condition of the engine changes, the ignition timing may be adjusted so as to provide the maximum fuel efficiency, quickly responding to the operating condition change.

BRIEF DESCRIPTION OF THE DRAWINGS

These and other objects and features of the invention will be apparent from the following description taken in connection with the accompanying drawings, wherein:

FIG. 1 is a characteristic curve showing relation of an ignition timing and an amount of fuel consumption of a usual type internal combustion engine;

FIGS. 2A and 2B are block diagrams of an ignition timing control apparatus according to the invention;

FIG. 4 is a map useful in explaining the operation of the apparatus shown in FIG. 2B; and FIG. 5 is a flow chart of an ignition timing control program of another embodiment according to the invention.

DESCRIPTION OF THE PREFERRED EMBODIMENT

Figure 3:
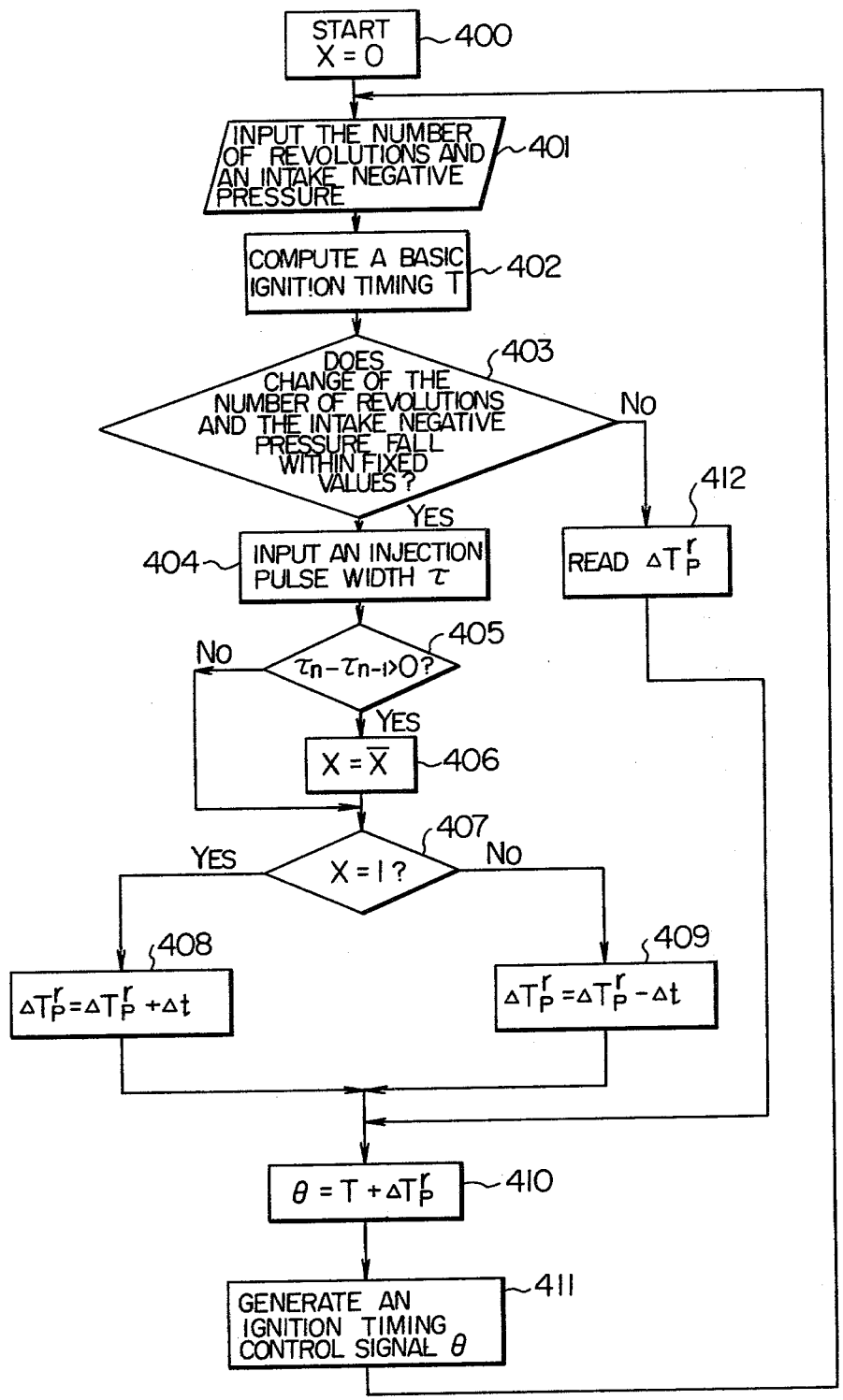
FIG. 3 is a flow chart of an ignition timing control program in the apparatus shown in FIG. 2B.

An embodiment of an apparatus and a method for controlling a timing of ignition spark according to the invention will be described with reference to the accompanying drawings.

In FIG. 1, there is shown a relation between fuel consumption F and ignition timing when the number of revolutions of an internal combustion engine and an engine shaft torque are kept at fixed values. It is well known that in the characteristic curve there is an optimum ignition timing $\theta$ to provide the maximum fuel efficiency or a minimum fuel consumption. In the present invention the fuel consumption and the ignition timing are feedback controlled so as to make the internal combustion engine operate at the optimum ignition timing to provide the maximum fuel efficiency.

FIG. 2a illustrates an embodiment of an engine control system to which the ignition timing control method according to the invention is applied. Reference numeral 1 designates an internal combustion engine, 11 an intake system, 6 and electronic control fuel injection unit, 2 an ignition unit, and 20 an ignition timing control apparatus. The electronic control fuel injection unit 6 determines an injection amount of fuel denoted as $\tau$ depending on an amount of intake air Q and the number of revolutions N, and drives an electromagnetic valve by a revolution signal such as an ignition trigger signal delivered from the ignition unit 2 synchronized with the revolution of the internal combustion engine, thereby to inject fuel intermittently. The fuel injection unit 6 with such a construction is well known and therefore no elaboration of its construction will be given. A duration $\tau$ of the drive signal for the electromagnetic valve represents an injection amount of fuel. The ignition unit 2 generates an ignition signal in response to an output signal, i.e. an ignition timing control signal, from the ignition timing control unit 20. The ignition timing control unit 20 has a microcomputer including a main ignition timing control program to determine a main ignition timing depending on the number N of revolutions and an intake pipe negative pressure P, and an ignition timing subcontrol program to determine a correction amount of ignition timing on the basis of an output $\tau$ from the electronic control fuel injection unit 6.

As shown in FIG. 2B, the ignition timing control unit 20 is comprised of an A-D converter 201 for converting an analog voltage signal representing an intake air negative pressure P into a corresponding digital signal a counter 203 for converting a time width of a pulse signal $\tau$ representing an injection amount $\tau$ of fuel into a corresponding digital signal, a central processing unit (CPU) for computing an ignition timing by using those digital signals, a read only memory (ROM) for storing a program to provide a sequence of calculations, a random access memory (RAM) 206 for storing the results of calculations in the CPU 204 temporarily, and a counter 207 for converting a digital signal representing an ignition timing computed by the CPU 204 into a pulse signal. Those circuits are interconnected one another through a bus 208 through which various data and operation commands are transferred. In the embodiment, in order to temporarily store the results of calculations by the CPU 204 temporarily in the RAM 206 in non-volatile manner, it is necessary to use a non-volatile RAM or when a volatile RAM is used it is necessary to refresh stored data by continuously supplying power to the RAM.

An ignition timing control program according to the ignition timing control method of the present invention will be described referring to a flow chart shown in FIG. 3. The program is stored in the ROM 205 and is executed by the CPU 204. When power is applied to the internal combustion engine 1 and a microcomputer is driven, the execution of the program starts at "START" in a step 400 which executes an initialization (correcting direction X=0, which will be described later). A step 401 fetches digital signals representing the number of revolutions N and the intake air negative pressure P. A step 402 computes a basic ignition timing T. Alternately it may be constructed to store a number of ignition timings T previously in the ROM 205 and to read one of the stored ignition timings T in correspondence with the number of revolutions N and the intake negative pressure P obtained in the step 401. A step 403 judges whether the number of revolutions N and the intake pipe negative pressure P, which are obtained in the step 401, fall within fixed values when compared with those N and P obtained in the step 401 at the last or preceding time. If both fall within the given values, the control advances to a step 404. At the step 404 a digital signal is inputted, representing a time width $\tau$ (referred to as a pulse width hereinafter) of an electromagnetic valve drive pulse produced from the electronic fuel injection apparatus 6. A step 405 calculates a difference between the current pulse width $\tau n$ and the previous pulse width $\tau n - 1$. When the difference is positive, that is, the fuel consumption is in increasing direction, the program sequence branches to YES (step 406). On the other hand, when the difference is negative, that is, the fuel consumption is in decreasing direction, the program sequence branches to NO (step 407). The step 406 is a step which inverts the ignition timing correcting direction X at the last time and the X has only "1" for an advance ignition timing or "0" for a retard ignition timing. If the correcting direction X is "1" in the preceding ignition timing control, it is inverted to "0" in the current control. Similarly, if it is "0" in the preceding control, it is inverted to "1" in the current control. A step 407 is a program switch for changing the branching direction depending on a value of the X. If X="1", representing that the ignition timing is to be advanced (in the direction of arrow $a_2$ in FIG. 1), the program sequence branches to NO (step 409). If X="0", representing that the ignition timing is to be retarded (in the direction of arrows $b_2$ in FIG. 2), the program sequence branches to NO (step 409). The steps 408 and 409 are steps for computing an ignition timing correcting amount $\Delta T$. In those steps, the correcting amount $\Delta T = \Delta T_p^r$ corresponding to a present engine running condition obtained in the step 401, for example, the number of revolutions N and the intake air negative pressure P is read out from a corresponding address in a map formed in an non-volatile memory area of RAM 206 within the microcompuer and an increment $\Delta t$ is added to or subtracted from the read out correcting amount, and rewrites the $\Delta T_p^r$ into the corresponding area of the memory. As shown in FIG. 4, the RAM 206 includes a number addressable memory areas which store the correction value $\Delta T$ and are addressed by the number of revolutions N and the intake negative pressure P. When a new correction value is obtained in the steps 408 and 409, the new correction value $\Delta T$ is stored in the RAM 206 in place of the old correction value which has been stored until then. A step 410 computes the final ignition period $\theta$ and adds the new correction value $\Delta T_p^r$ obtained in the steps 408 and 409 to the basic ignition timing T computed in the step 402. A step 41 produces a digital signal representing the final ignition timing toward the counter 207 and then returns to the step 401.

The pulse width $\tau n$ measured in the step 404 may also be calculated by the following equation to calculate the average value of several pulse widths in order to eliminate an error by a variation of the pulse widths.

$$\tau n = \frac{\tau n + \tau(n-1) + \ldots + \tau(n-a)}{a+1}$$

The step 403 detects that either the number of revolutions N or the intake air negative pressure P changes to be apart from the preceding one by a value beyond the given value, the program execution steps to a step 412 where the correcting amount $\Delta T_p^r$ corresponding to the present number of revolutions N and the present intake negative pressure P is read out from a map within the memory as shown in FIG. 4. Then, the CPU program sequence advances to a step 410 where no calculation of the correcting amount $\Delta T_p^r$ is performed unlike the preceding step.

As described above, correction value $\Delta T$ of the ignition timing is successively learned and stored for each enging operating condition and when the operating condition becomes identical with the preceding one, the ignition timing is corrected by using the correction value $\Delta T$ stored at the preceding time to correct the ignition timing so that the fuel efficiency is maximized.

Another embodiment of the ignition timing control method according to the invention will be described. The apparatus as shown in FIG. 2 which apparatus is the same as one used in the embodiment shown in FIGS. 2 to 4 is used. In the first control method, by computing a difference between the amount of fuel consumption in the current cycle and that of the preceding cycle the direction of increase or decrease of the amount of fuel consumption is detected and the correction amount $\Delta T$ of the ignition period is calculated. In the ignition timing control method of this embodiment, by calculating a difference between the ignition times T and a difference between the amounts of fuel consumption in the current cycle and in the preceding cycle, a relation between the ignition timing T and the amount of fuel consumption is measured, and the correction value $\Delta T$ ($= \Delta T_p^r$) is so controlled as to reduce the amount of fuel consumption. That is, in the graph with the absissa representing an ignition timing $\theta$ and the ordinate representing an amount of fuel consumption F, the points of coordinates ($\theta n-1$, $Fn-1$) and ($\theta n$, Fn) are obtained and an ignition timing correction value $\Delta T$ is controlled so as to obtain a point Fo as a minimum of the fuel consumption Fn.

The second embodiment will be described with reference to FIG. 5 which shows a flow chart illustrating the ignition timing control method of the embodiment. The program starts from a step 500. At a step 501 data of the number of revolutions N and the intake air negative pressure P are fetched. At a step 502 an ignition timing T under the main ignition timing control program is computed. At a step 503 it is judged whether changes of the current or present number of revolutions N and the present intake negative pressure P to those of the preceding cycle fall within or out of fixed values. If both the values fall within the fixed values, the program sequence advances to a step 504. At the step 504 data representative of the pulse width $\tau$ produced from the electronic control fuel injection unit 6 is inputted. At a step 505 a difference between the actually detected present ignition timing $\theta n$ and the preceding ignition timing $\theta n-1$ (the actual preceding ignition timing) is computed. When the result of the computation is positive, that is, the ignition timing is in the advance direction (in the direction of an arrow $a_1$ or $b_2$ in FIG. 1), the program sequence branches to YES. On the other hand, when it is negative, that is, the ignition timing is in the retardation direction (in the direction of an arrow $a_2$ or $b_1$ in FIG. 1), the program sequence branches to NO. In steps 506 and 507, a difference between the pulse width $\tau n$ of the current cycle and the pulse width $\tau$ $\tau(n-1)$ in the preceding cycle is computed, if the difference is positive, that is, the pulse width is in the increasing direction (indicated by the arrow $a_2$ or $b_2$), the program sequence branches to YES. On the other hand, if it is negative, that is, the pulse width is in the decreasing direction (as indicated by the arrow $a_1$ or $b_1$ in FIG. 1), the program sequence branches to NO. In steps 508 and 509 which are for calculating the ignition timing correction value $\Delta T$, a correction value $\Delta T = \Delta T_p^r$ for the present or current engine operating condition, i.e. the number of revolutions N and the intake air negative pressure P, is read out from a corresponding address of the map as shown in FIG. 4 in the non-volatile memory of the microcomputer. An increment $\Delta t$ is added to or subtracted from the read out correction value, and the $\Delta T_p^r$ obtained after the computation is loaded to the corresponding address in place of the old correction value. A step 510 is a step to compute the final ignition timing $\theta$ and in the step the correction value $\Delta T$ computed by the step 508 or 509 is added to the ignition timing T obtained in the step 502. A step 511 produces the final ignition timing $\theta$ in the form of a ignition control signal and applies it to the counter 207, and then returns to the step 501.

In the step 503, if either the number of revolutions N or the intake air pressure P in the present cycle changes from the corresponding one in the preceding cycle by more than a fixed value, the program sequence advances to a step 512 where the correction value $\Delta T_p^r$ for the current data N and P is read out from the map in the memory, and then the program sequence advances to the step 510, and the correction value $\Delta T_p^r$ is not computed.

In each of the above-mentioned embodiments as the electronic control fuel injection unit 6 a control circuit which is separated from the ignition timing control unit 20 is used. However, it may be constructed to use the microcomputer used as the ignition timing control unit 20 for computing amount of the fuel injection, that is, for computing the injection pulse width as known.

In the above-mentioned embodiment, the amount of fuel consumption is measured by using the pulse width $\tau$ as an output signal from the electronic control fuel injection unit 6, as described above. When the fuel supply device is a carburetor, the amount of the fuel consumption is measured by using a fuel flow meter and the control method as mentioned above may be similarly employed for the ignition timing control.

What is claimed is:

1. An apparatus for controlling a timing of ignition spark to be supplied to ignite a mixture of air and fuel supplied to an internal combustion engine comprising:
    means for sensing operating conditions of said engine;
    means for sensing an amount of fuel supplied to said engine;
    means for storing, in a nonvolatile manner, a group of correction values in respective addressable storage locations;
    means for computing a timing of ignition spark, so that a fuel efficiency relative to the output torque of said engine is maximized, said computing means including:
    means for determining a basic timing of an ignition spark in accordance with said operating conditions sensed currently;
    means for discriminating whether said operating conditions sensed currently are close to or apart from said operating conditions sensed precedingly, said discriminating means providing first and second outputs respectively indicating that the former is close to or apart from the latter;
    means for discriminating, in response to said first output, whether said amount of fuel sensed currently in larger or less than said amount of fuel sensed precedingly,
    means for determining a new correction value in accordance with the discrimination result of said latter discriminating means and with one of said correction values stored in one of said storage locations addressed in correspondence with said operating conditions sensed currently, said new correction value being more effective to maximize said fuel efficiency than said one of said correction values is and being stored in said one of said storage locations in place of said one of said correction values, and
    means for correcting said basic timing of ignition spark by said new correction value, said correcting means correcting the same by another one of said correction values stored in another one of said storage locations addressed in correspondence with said operating conditions sensed currently in response to said second output; and
    means for supplying said engine with an ignition spark at said corrected timing of ignition spark.

2. An apparatus for controlling a timing of ignition spark to be supplied to ignite a mixture of air and fuel supplied to an internal combustion engine comprising:
    means for sensing operating conditions of said engine;
    means for sensing amount of fuel supplied to said engine;

means for storing, in a non-volatile manner, a group of correction values in respective addressable storage locations;

means for computing a timing of ignition spark so that a fuel efficiency relative to the output torque of said engine is maximized, said computing means including:

means for determining a basic timing of ignition spark in accordance with said operating conditions sensed currently, means for discriminating whether said operating conditions sensed currently is close to or apart from said operating conditions sensed precedingly, said discriminating means providing first and second outputs respectively indicating that the former is close to or apart from the latter, means for comparing, in response to said first output, an actual timing of ignition spark supplied to said engine currently with an actual timing of ignition spark supplied to said engine precedingly, means for comparing, in response to said first output, said amount of fuel sensed currently with said amount of fuel sensed precedingly, means for determining a new correction value in accordance with the comparison results of said two comparing means and with one of said correction values stored in one of said storage locations addressed in correspondence with said operating conditions sensed currently, said new correction value being more effective to maximize said fuel efficiency than said one of said correction values is and being stored in said one of storage locations in place of said one of said correction values, and means for correcting said basic timing of ignition spark by said new correction value, said correcting means correcting the same by another one of said correction values stored in another one of storage locations addressed in correspondence with said operating conditions sensed currently in response to said second output; and means for supplying said engine with an ignition spark at said corrected timing of ignition spark.

3. A method for controlling a timing of an ignition spark to be supplied to ignite a mixture of air and fuel supplied to an internal combustion engine comprising the steps of:

sensing the number of revolutions of the engine and an intake air negative pressure;

computing the basic timing of an ignition spark by using the number of revolutions and the intake air negative pressure;

sensing an amount of fuel supplied to the engine when the number of revolutions sensed and the intake air negative pressure sensed is close to those sensed in the preceding ignition cycle;

discriminating or judging whether said amount of fuel sensed currently is larger or less than said amount of fuel sensed precedingly;

reading out the correction values of the ignition timing for the number of revolutions and the intake air negative pressure stored in a non-volatile memory device, correcting the ignition timing correction values so as to maximize the fuel efficiency on the basis of the judgement of the amount of fuel supplied, and storing the corrected correction values of the ignition timing into the memory in place of the correction value before it is corrected;

determining an ignition timing by correcting the basic ignition timing on the basis of the corrected ignition correction value of the ignition timing;

determining an ignition timing by correcting the basic ignition timing by using the uncorrected correcting value of ignition timing when the number of revolutions sensed currently and the intake air negative pressure sensed currently are apart from those sensed precedingly; and transferring an ignition signal to the internal combustion ignition device in accordance with the ignition timing determined.

4. The ignition timing control method according to claim 3, further comprising the step of comparing an actual timing of ignition spark sensed currently with an actual timing of ignition spark sensed precedingly, when the number of revolutions currently sensed and the intake air negative pressure currently sensed are close to those precedingly sensed.

5. An apparatus for controlling ignition spark timing for an internal combustion engine comprising:

means for sensing operating conditions of said engine;

means for sensing an amount of fuel supplied to said engine;

means for determining ignition spark timing so that a fuel efficiency relative to the output torque of said engine is maximized, said timing determining means including:

means for determining a timing of an ignition spark in accordance with said operating conditions sensed currently, means for discriminating whether said operating conditions sensed currently are close to or apart from said operating conditions sensed precedingly, said discriminating means providing an output indicating that the former is close to the latter, and means responsive to said output, for step-wise altering, during each engine cycle, said timing to minimize the fuel supplied to said engine; and means for supplying said engine with an ignition spark at said altered timing.

6. An apparatus for controlling ignition spark timing for an internal combustion engine comprising:

means for sensing operating conditions of said engine;

means for sensing an amount of fuel supplied to said engine;

means for determining ignition spark timing so that a fuel efficiency relative to the output torque of said engine is maximized, said timing determining means including:

means for determining a basic timing of an ignition spark in accordance with said operating conditions sensed currently, means for determining a correction value in accordance with said operating condition sensed currently, means for discriminating whether said operating conditions sensed currently are close to or apart from said operating conditions sensed precedingly, said discriminating means providing first and second outputs respectively indicating that the former is close to and apart from the latter, means for discriminating, in response to said first output, whether said amount of fuel sensed currently is greater or less than said amount of fuel sensed precedingly, means for revising a correction value corresponding to the operating conditions currently sensed in accordance with the discriminating result of said latter discriminating means, said revised correction value being more effective to maximize said fuel efficiency than said correction value, and means for correcting said basic timing of ignition spark by said revised correction value said correcting means correcting the same by another one of said correction values in correspondence with said operating conditions sensed currently in response to said second output; and means for supplying said engine with an ignition spark at said corrected timing of ignition spark.

7. An apparatus for controlling ignition spark timing for an internal combustion engine comprising:

means for sensing operating conditions of said engine;

means for sensing an amount of fuel supplied to said engine;

means for determining ignition spark timing so that a fuel efficiency relative to the output torque of said engine is maximized, said timing determining means including:

means for determining a basic timing of an ignition spark in accordance with said operating conditions sensed currently, means for determining a correction value in accordance with said operating conditions sensed currently, means for discriminating whether said operating conditions sensed currently are close to or far apart from said operating conditions sensed precedingly, said discriminating means providing first and second outputs respectively indicating that the former is close to or apart from the latter, means for comparing, in response to said first output, an actual timing of ignition spark supplied to said engine currently with an actual timing of ignition spark supplied to said engine precedingly, means for comparing, in response to said first output, an amount of fuel sensed currently with said amount of fuel sensed precedingly, means for revising a correction value corresponding to said operating conditions sensed currently in accordance with the comparison results of said two comparing means, said revised correction value being more effective to maximize said fuel efficiency than said correction value, and means for correcting said basic timing of spark ignition by said revised correction value, said correcting means correcting the same by another correction value in correspondence with said operating conditions sensed currently in response to said second output; and means for supplying an engine with an ignition spark at said corrected timing of spark ignition.

8. A method for controlling ignition spark timing for an internal combustion engine comprising the steps of:

sensing operating conditions of said engine;

sensing an amount of fuel supplied to said engine;

determining a timing of an ignition spark in accordance with said operating conditions sensed currently;

discriminating whether said operating conditions sensed currently are close to or apart from said operating conditions sensed precedingly, said discriminating step providing an output indicating that the former is close to the latter;

step-wise altering said timing during each engine cycle in response to said output to minimize the fuel supplied to said engine; and supplying said engine with an ignition spark at said altered timing.

9. A method for controlling ignition spark timing for an internal combustion engine comprising the steps of:

sensing operation conditions of said engine;

sensing an amount of fuel supplied to said engine;

determining a basic timing of an ignition spark in accordance with said operating conditions sensed currently;

determining a correction value in accordance with said operating conditions sensed currently;

discriminating whether said operating conditions sensed currently are close to or apart from said operating conditions sensed precedingly, said discriminating step providing first and second outputs respectively indicating that the former is close to and apart from the latter;

discriminating, in response to said first output, whether said amount of fuel sensed currently is greater or less than said amount of fuel sensed precedingly;

revising a correction value in accordance with the discrimination results of said latter discriminating step, said revised correction value being more effective to maximize said fuel efficiency than said correction value;

correcting said basic timing of ignition spark by said revised correction value in response to said first output;

correcting said basic timing of ignition spark by a correction value corresponding to said operating conditions currently sensed in response to said second output; and supplying said engine with an ignition spark at said correction timing of ignition spark.

* * * * *